(12) United States Patent
Muenter et al.

(10) Patent No.: US 7,265,331 B2
(45) Date of Patent: Sep. 4, 2007

(54) OPTICAL SENSING APPARATUS AND METHOD FOR DETERMINING HIGHEST INTENSITY OF LIGHT IN AN ARRAY

(75) Inventors: Steven E. Muenter, Van Nuys, CA (US); Jon E. Hunt, West Hills, CA (US)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 11/057,939

(22) Filed: Feb. 15, 2005

(65) Prior Publication Data

US 2006/0180746 A1    Aug. 17, 2006

(51) Int. Cl.
*G01J 1/42* (2006.01)

(52) U.S. Cl. .................. 250/208.2; 250/203.6; 382/103

(58) Field of Classification Search ............. 250/208.2, 250/203.1, 203.6; 382/103
See application file for complete search history.

(56) References Cited

U.S. PATENT DOCUMENTS

| 2,632,058 | A |   | 3/1953  | Gray                   |
|-----------|---|---|---------|------------------------|
| 3,705,956 | A | * | 12/1972 | Dertouzos ........ 341/5 |
| 4,806,747 | A | * | 2/1989  | Dunavan et al. ..... 250/206.1 |
| 4,942,291 | A | * | 7/1990  | Dietrich .......... 250/203.3 |
| 5,103,083 | A | * | 4/1992  | Reed et al. ........ 250/214 VT |
| 5,483,060 | A | * | 1/1996  | Sugiura et al. ..... 250/237 R |
| 5,756,999 | A | * | 5/1998  | Parrish et al. ........ 250/332 |

* cited by examiner

*Primary Examiner*—Thanh X. Luu
*Assistant Examiner*—Stephen Yam
(74) *Attorney, Agent, or Firm*—MacPherson Kwok Chen & Heid LLP; Brent A. Folsom

(57) ABSTRACT

A plurality of optical sensing elements in an array where each element has a unique element address identifying the element location. Each element senses light and produces an element address signal in proportion to the intensity of the light sensed by the element. The element address signal corresponding to the highest intensity sensed by the array is asserted as an array output signal.

20 Claims, 13 Drawing Sheets

OPTICAL SENSING APPARATUS AND METHOD FOR DETERMINING HIGHEST INTENSITY OF LIGHT IN AN ARRAY

TECHNICAL FIELD

The present invention relates generally to optical sensors, and more particularly to a customized focal plane array with a Gray code output.

RELATED ART

Optical position sensors for use in Acquisition, Tracking, and Pointing (ATP) systems typically function by detecting light from a radiant or illuminated object using an optical sensor array including light sensitive detector elements. Electronic signals from the detector elements are processed to determine information about the object based on the detected light.

The electronic output of an optical sensor array is typically digitized and can be arithmetically processed to determine the position of a radiant or reflective object based on a light pattern corresponding to an image of the object received by the sensor array. Additional processing algorithms may be required to compensate for sensor nonlinearities, background illumination, and other factors. This additional processing introduces latency that can adversely affect the performance of closed-loop tracking algorithms.

Optical detectors used for ATP can be always-on, or staring-type detectors that are either pixel based (discrete) or analog based. Pixel based detectors can include some traditional Focal Plane Arrays (FPAs) and Quad-Cell Photodiode (QCP) Arrays, and usually require Analog-to-Digital (A/D) converters along with a sophisticated control unit such as a microprocessor for processing the signals from the detector array.

Traditional FPAs, in particular, typically require complex support electronics to generate the necessary control signals for serially reading the intensity at each pixel at predetermined periods. Larger FPAs require a longer readout period resulting in increased latency. Digital image processing techniques can then be used to identify the position of the target image on the FPA. This type of processing typically requires the use of a microprocessor with associated RAM, ROM, A/D converters, and digital Input-and-Output (I/O), for example. Simpler devices like Quad-cells require much less support electronics and signal processing, but typically only produce a linear position signal that is representative of the location of the centroid of the illuminated target image when the image is already nearly centered on the detector. However, each sensor can have unique offsets and nonlinearities which may require further processing to compensate for or correct.

Analog-based detectors can include Photo-potentiometers (Photopots) and typically use analog processing elements, such as dividers and summing amplifiers, to process the analog signals from the detectors. Since Photopots respond to the centroid of the illumination, they are less able to differentiate between or filter out interference sources. Thus, there remains a need for a simpler, faster apparatus and method to detect illuminated images with reduced processing requirements.

SUMMARY

Systems and methods are disclosed herein to provide low latency, continuously valid image information with a minimum of support and processing electronics. For example, in accordance with an embodiment of the present invention, an optical sensing apparatus includes a plurality of optical sensing elements arranged in an array where each element has a unique element address identifying the element location. Each element senses light and produces an element address signal in proportion to the intensity of the light sensed by the element. The element address signal corresponding to a highest intensity sensed by the array is asserted as a continuously valid array output signal. In accordance with another embodiment, the element address is encoded according to a binary Gray coding scheme where the address encoding for side adjacent elements differs by the value of one binary digit.

Another embodiment further includes a buffer that receives the array output signal and produces a buffered array output signal. In this embodiment, the buffer can include a threshold comparator where the threshold comparator receives an input signal having a signal level less than or equal to a predetermined low signal level and produces a low signal output. The threshold comparator receives an input signal having a signal level greater than or equal to a predetermined high signal level and produces a high signal output. The buffer can include a threshold comparator that receives an input signal that has a signal level that is both greater than a predetermined low signal level and less than a predetermined high signal level and produces an intermediate signal output. The buffer can include a differentiator that receives an array output signal and produces a positive-going signal output when the array output signal changes from a lower value to a higher value. The differentiator produces a negative-going signal output when the array output signal changes from a higher value to a lower value. In another embodiment, the buffer can include a level shifter that receives an array output at a first level and produces a corresponding output signal at a second level.

In one embodiment, the optical sensing element includes an optical sensor and an address generator. The optical sensor receives light and produces an optical sensor signal in proportion to the intensity of the received light. The address generator receives the optical sensor signal and produces the unique address of the element within the array in proportion to the optical sensor signal. In another embodiment, the address generator includes an electronic circuit with a predetermined number of current-based devices. The current-based devices can include a predetermined number of current sourcing and current sinking devices. In one embodiment, the current sourcing and current sinking devices include a plurality of bipolar transistors arranged in a current mirror configuration and operatively connected to produce a mirror current in proportion to the optical sensor signal. In one embodiment, the array is one-dimensional with either a row or a column arrangement.

In another embodiment, the array is two-dimensional and has a row and column arrangement. In this embodiment, the array output signals for each row and each column can be separate to produce one array output signal for each row and one array output signal for each column. In another embodiment, the array output signals of each row are combined to produce a single row address for a plurality of rows, and the array output signals of each column are combined to produce a single column address for a plurality of columns.

In another embodiment, an optical sensing system includes a plurality of optical sensing elements that sense light from an object to produce an array output signal and a processing unit that receives the array output signal and determines object location information. The optical sensing elements are arranged in a two-dimensional array. Each optical sensing element has a unique row and column address identifying the optical sensing element location within the array. Each optical sensing element within the array senses light from an object and produces a row address signal and a column address signal in proportion to the intensity of the light sensed by the optical sensing element. A row address signal corresponding to a highest intensity sensed by each row array element is asserted as the corresponding row output signal, while a column address signal corresponding to a highest intensity sensed by each column array element is asserted as the corresponding column output signal. The plurality of row address signals and plurality of column address signals comprise a continuously valid array output signal.

In another embodiment, each row address signal and column address signal is encoded in a binary Gray coding so that the encoding of side adjacent elements within each row and column differs by only one bit value. The light sensed by the array includes an image pattern that has a plurality of image light levels.

In one embodiment, the plurality of row outputs and the plurality of column outputs identify the location of the most intense light detected by each row and column. In another embodiment, the output of each row is combined to produce a single row address output for the plurality of rows, while the output of each column is combined to produce a single column output for the plurality of columns. In this manner, the single row output and the single column output identify the location of the single element in the array receiving the most intense light from the image pattern.

In another embodiment, the system further includes a buffer for receiving the array output signal and produces a buffered array output signal. The buffer can include a threshold comparator that receives an input signal that has a signal level less than or equal to a predetermined low signal level and produces a low signal output. The threshold comparator receives an input signal that has a signal level greater than or equal to a predetermined high signal level and produces a high signal output. The threshold comparator can receive an input signal having a signal level that is both greater than a predetermined low signal level and less than a predetermined high signal level and produces an intermediate signal output.

In another embodiment, a method of determining the most intense light from a light pattern includes detecting a received light pattern with a plurality of optical sensing elements arranged in an array, asserting an address information for each optical sensing element based on the intensity of the received light, and producing an array output signal corresponding to the location of the optical sensing element within the array receiving the most intense light. In another embodiment, the address information is encoded as a binary Gray code. In another embodiment, the method further includes combining a plurality of row address outputs into a single row address output, and combining a plurality of column address outputs into a single column address output. In this manner, the single row address output and the single column address output together identify the single optical sensing element receiving the most intense light. In another embodiment, the method further includes determining an object location information signal, where the received light is from the object and the object location information is continuously valid.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Embodiments of the present invention and their advantages are best understood by referring to the detailed description that follows. It should be appreciated that like

DETAILED DESCRIPTION

The present invention, as defined in the claims, provides for low latency, continuously valid image information and target position detection with a minimum of support and processing electronics.

Figure 1:
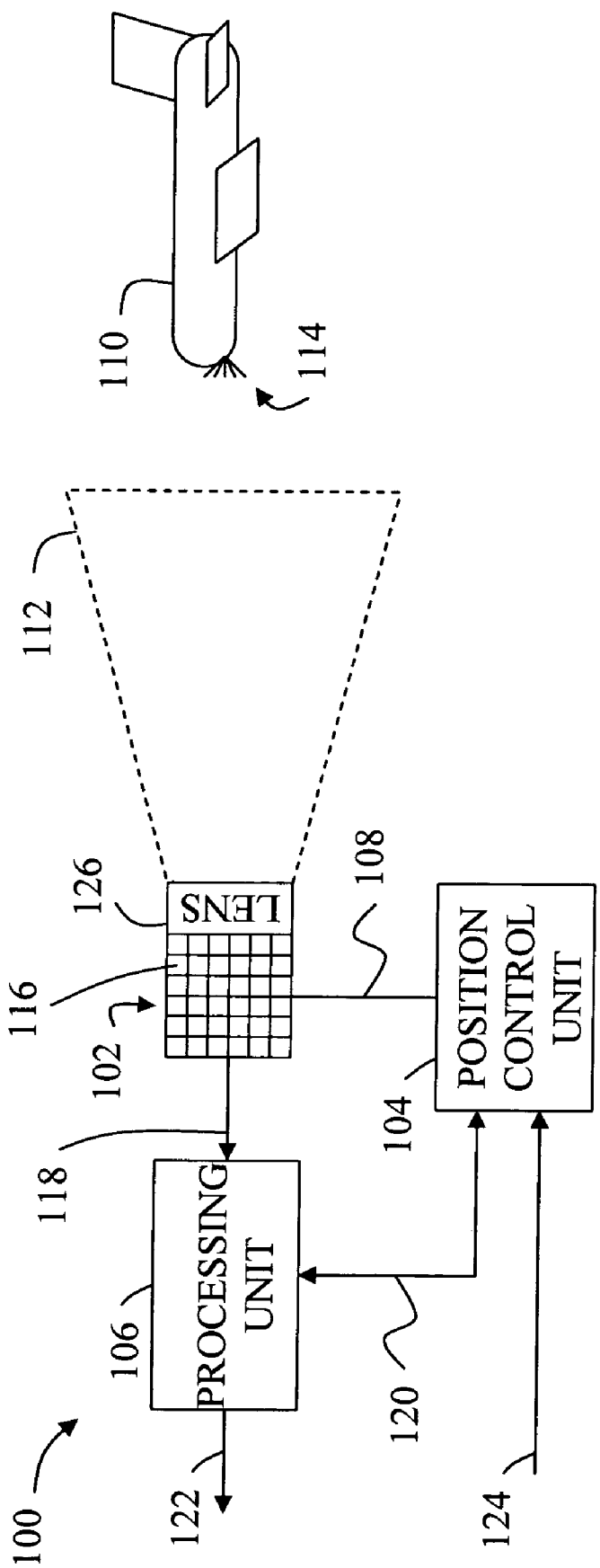
FIG. 1 shows an optical sensing system in accordance with an embodiment of the present invention.

FIG. 1 shows one embodiment of an optical sensing system 100 including a Customized Focal Plane Array (CFPA) 102, a position control unit 104, a processing unit 106, and imaging optics 126. Position control unit 104 is operatively connected through a support mechanism 108 to CFPA 102 in order to control the angular position and elevation angle so that CFPA 102 can be positioned so that illumination from an object 110 within a field of view 112 will be focused and reimaged onto CFPA 102. Illumination from an object can include reflected or emitted light 114. For the purposes of this disclosure, light 114 can include any electromagnetic radiation that can be detected as disclosed including infrared to ultraviolet light. Further, support mechanism can include any mechanism for pointing or positioning a sensing device as known in the relevant art. Imaging optics 126 can include a lens for focusing the reflected or emitted light 114 that impinges on CFPA 102. Reflected light can be from a source in proximity to CFPA 102 or may be reflected light from a natural or other source. Emitted light can be from an aircraft strobe beacon, an aircraft landing light, a muzzle flash from a weapon, a rocket launch, or some other source associated the object 110. Alternatively, support mechanism 108 may be omitted if CFPA 102 is fixed on a mounting or hand-held.

CFPA 102 includes an array of sensor elements 116 where each element 116 outputs unique address information based on the location of the element within the array 102. In a one-dimensional array, the address information includes a row or column location within the array 102. In a two-dimensional array, the address information includes an X-Y, row and column, location within the array 102. The sensor elements 116 are assigned an encoded address corresponding to the location information. In one embodiment, the encoded address information includes Gray code values so that only one bit changes at a time if the illumination from the focused image of the object traverses the array of sensor elements 116. This provides instantaneous and continuously valid address information. In a two-dimensional embodiment, CFPA 102 includes a collection of X and Y busses in an interconnection network, such as a backplane wiring pattern, where each bus line represents one bit of the corresponding X or Y bus address or signal.

In a binary Gray coding scheme, the encoding for side adjacent elements 116 differs by only one binary digit (bit). A side adjacent element is an element that borders on either a vertical or horizontal side, in contrast to a diagonally adjacent element. The X and Y busses in the backplane wiring pattern are asserted as a continuously valid array output signal 118 to processing unit 106 which determines the location of object 110 based on the addresses of elements 116 receiving illumination from object 110. With one CFPA 102, only the relative azimuth position and elevation of object 110 may be determined for any instant of time based on the illumination upon one or more sensor elements 116. With two or more CFPA 102, a composite or stereoscopic illumination pattern may be detected, providing depth information in addition to the relative azimuth position and elevation of the illumination from object 110. If the distance and orientation of the two or more CFPA 102 relative to each other are known, then three dimensional information may be constructed.

Processing unit 106 receives position information from position control unit 104 and outputs movement control information to position control unit 104 over a control bus 120. If a history of location information is collected over time, then a path of object 110 may be determined, and used in prediction to some extent. Processing unit 106 outputs a position information signal 122 that may be provided to a user or supplied to a targeting system, for example. Alternatively, an external position control signal 124 can be supplied in order to point CFPA 102 in a particular direction. Once CFPA 102 is oriented at the particular direction, processing unit 106 can direct position control unit 104 to perform a sweep of an area around the pointing direction. An image focusing unit 126, including an optical lens and supporting structure, may be used to focus the illumination image pattern upon the detecting elements of CFPA 102.

Figure 2:
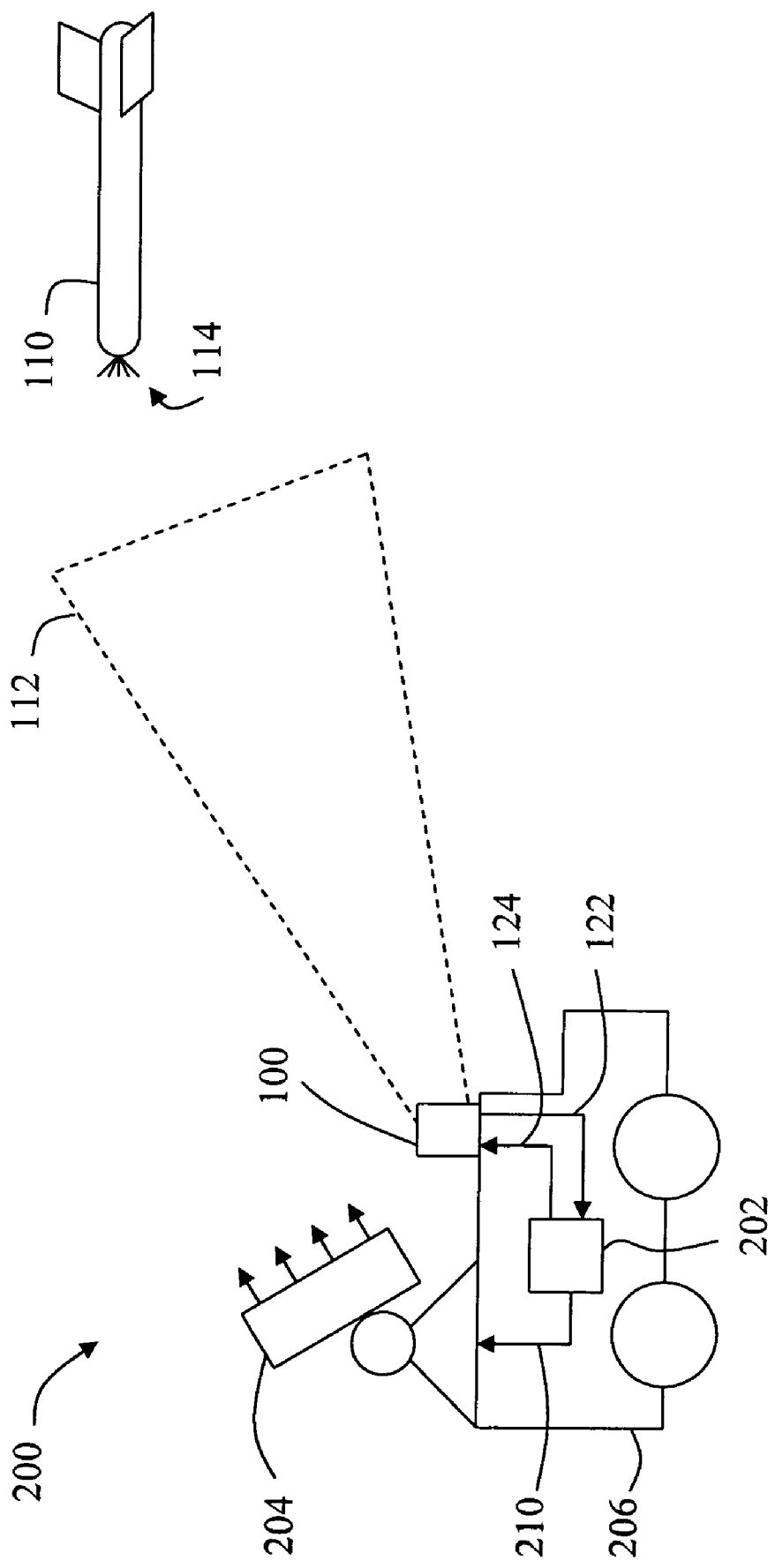
FIG. 2 shows a weapon system in accordance with an embodiment of the present invention.

FIG. 2 shows one embodiment of a weapon system 200 utilizing optical sensing system 100. Illumination from object 110 within field of view 112 is sensed by optical sensing system 100 which outputs position information signal 122 to a fire control unit 202 which then outputs a fire control signal 210 for controlling the targeting and deployment operations of a weapon 204. Fire control unit 202 outputs position direction information 124 to optical sensing system 100 in order to select a general area of detection. Weapon system 200 may be mounted on a land-based vehicle 206, a plane, a ship, or other movable platform. Alternatively, weapon system 200 may be fixed at a particular location in a ground-defense configuration.

Figure 3:
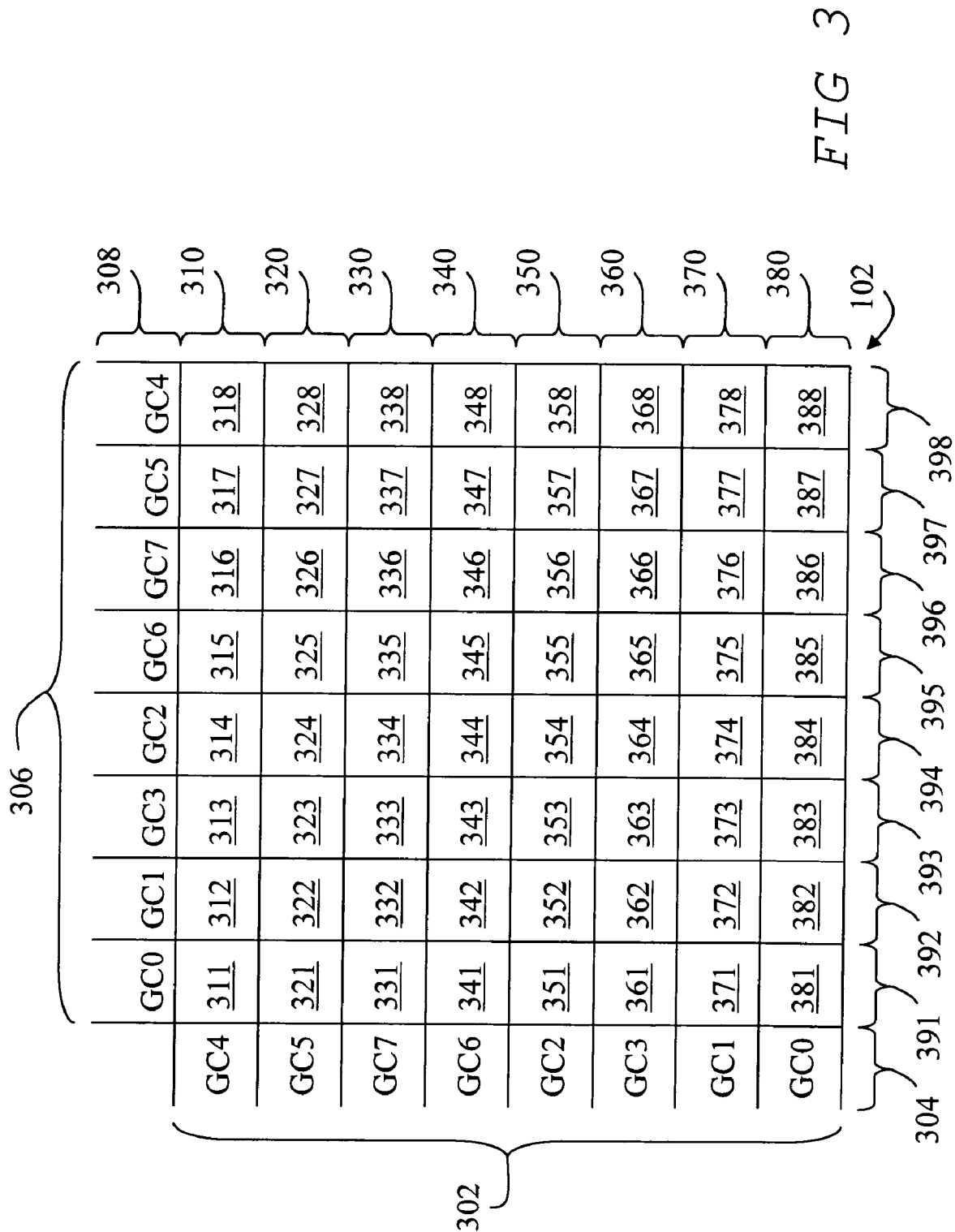
FIG. 3 shows a Custom Focal Plane Array (CFPA) including an 8×8 array of photodetector elements in accordance with an embodiment of the present invention.

FIG. 3 shows one embodiment of a Custom Focal Plane Array (CFPA) 102 including an 8×8 array 102 of photodetector elements 116 shown as elements 311-318, and 321-328, through 381-388. The size of the 8×8 array 102 can include any reasonable size depending on the technology used to implement the particular embodiment, including an array 102 as small as four-elements arranged in a 2×2 square, or as large as 64K-elements arranged in a 256×256 square, or larger. Preferably, the array 102 will range in size from about 64×64 elements to about 256×256 elements. Alternatively, CFPA 102 may be arranged as a rectangular array configuration where the number of rows is different from the number of columns.

In the present 8×8 CFPA 102 example, each of the plurality of rows 302 is assigned a particular row address value 304. For example, row address value 304 may be assigned a Gray code value labeled GC0 through GC4. For an eight element row array, each row element address is represented by a three-bit Gray code where {GC0, GC1, GC3, GC2, GC6, GC7, GC5, GC4} corresponds to encodings {000, 001, 011, 010, 110, 111, 101, 100} respectively. Similarly, each of the plurality of columns 306 is assigned a particular column address value 308. For example, the column address value 308 may be assigned a Gray code value labeled GC0 through GC4, as described above.

By definition, a Gray coding enforces a single binary bit value change between side adjacent elements so as to provide a valid address value to within one bit accuracy, even when the address value or indicated location may be changing. In this case, if the illumination upon the array 102 changes so that one array element is activated while a neighboring element is deactivated in response to the illumination, then the array 102 will assert continuously valid location information at every instant. In contrast, a traditional binary encoding of sequentially located elements may suffer a roll-over type error where the value "011" changing to "100" may momentarily appear as some other value such as "111" or "000" which corresponds to a much larger error. This could give rise to an erroneous output indication depending on when the changing output is sampled or utilized.

A first row 310 of CFPA 102 includes elements 311-318 and corresponds to the row address GC4 and column addresses {GC0-GC4} respectively. A second row 320 of CFPA 102 includes elements 321-328 and corresponds to the row address GC5. This pattern is repeated in this embodiment through a last row 380 of CFPA 102 that includes elements 381-388 and corresponds to the row address GC0. Similarly, a first column 391 of CFPA 102 includes elements 311-381 and corresponds to the column address GC0 and row addresses {GC4-GC0} respectively. A second column 392 of CFPA 102 includes elements 312-382 and corresponds to the column address GC1. This pattern is repeated in this embodiment through a last column 398 of CFPA 102 includes elements 318-388 and corresponds to the column address GC4.

Figure 4:
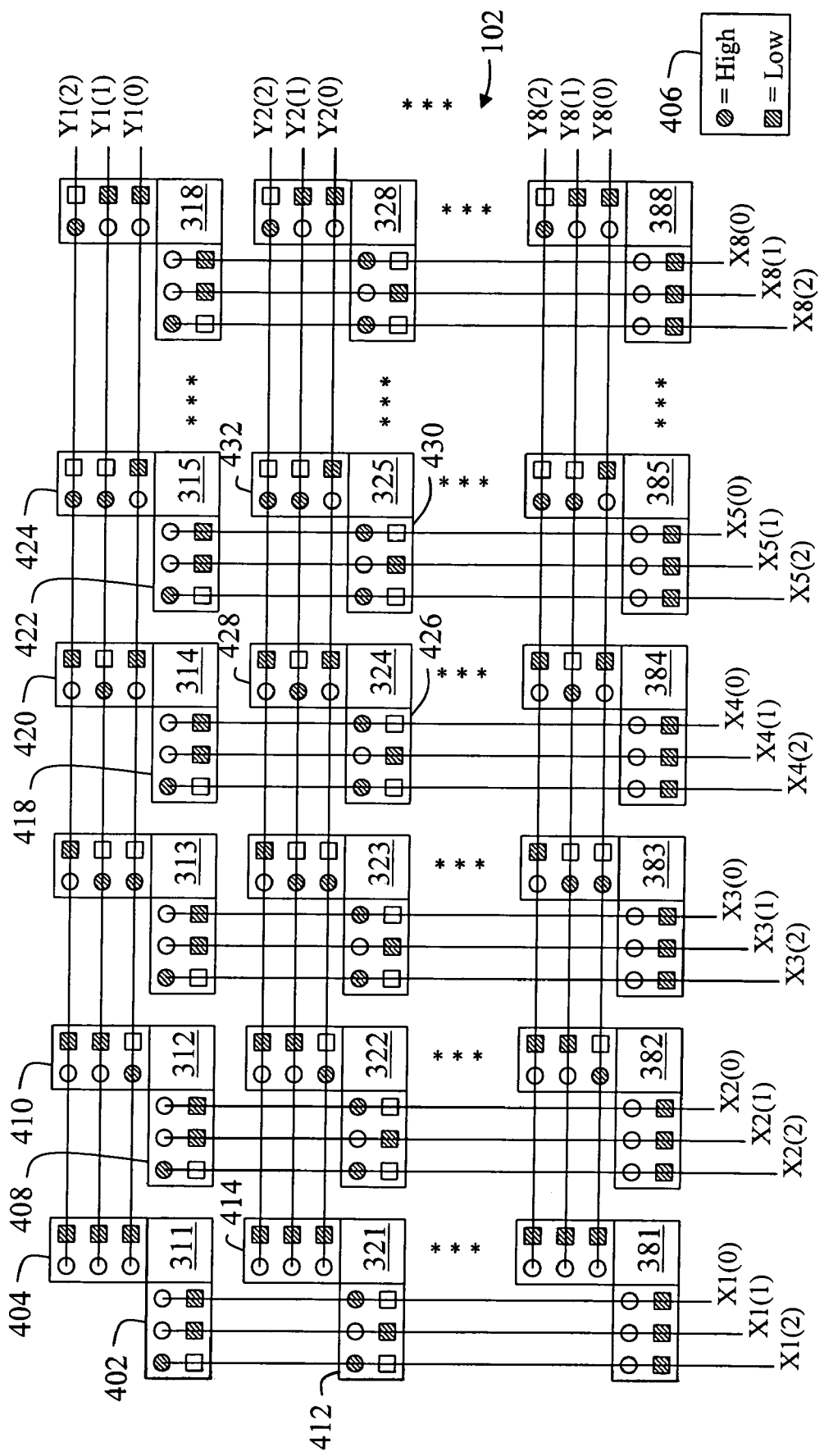
FIG. 4 shows a two-dimensional CFPA including row and column address generators for generating the appropriate Gray code address values in accordance with an embodiment of the present invention.

FIG. 4 shows one embodiment of a two-dimensional CFPA 102 including row and column address generators for each array element for generating the appropriate Gray code address values. Element 311 includes a row address generator 402 for generating the row address GC4 on the address output bus X1(2:0) and a column address generator 404 for generating the column address GC0 on the address output bus Y1(2:0). Although, in these examples, the X and Y busses have three bits corresponding to the eight rows or columns, the actual number of bits or bus lines is determined by the log (base-2) of the number of element locations along the particular encoded dimension. Hereinafter, these busses will be referenced simply by X1, Y1, and so on, unless a particular bit within the address bus is referenced. In these examples, logic values 406 for each address generator (402, 404) are High for "1" and Low for "0". Alternatively, the sense of these logic values may be inverted based on convention or the use of inverting logic.

Element 312 includes a row address generator 408 for generating the row address GC4 on the address output bus X2 and a column address generator 410 for generating the column address GC1 on the address output bus Y2. Row address generators 402 and 408 assert the same address value, in this case a Gray code, when either is activated. Element 321 includes a row address generator 412 for generating the row address GC5 on the address output bus X1 and a column address generator 414 for generating the column address GC0 on the address output bus Y2. Column address generators 404 and 414 assert the same address value, in this case a Gray code, when either is activated. The column address generators of Elements 311, 312, 313, 314, 315, 316, 317, and 318 cooperate to produce a single column address Y1 corresponding to the column address of an activated detector element 116 within the first row 310. Similarly, the row address generators of Elements 321, 322, 331, 341, 351, 361, 371, and 381 cooperate to produce a row address X1 corresponding to the row address of an activated detector element 116 within the first column 391. Each row address generator in the first row 310 asserts the same value GC4. Similarly, each column address generator in the first column 391 asserts the same value GC0. In like manner, the row and address generators for each row and column produce their respective row and column addresses to produce unique element location information to identify the location of activated elements within the array 102.

Figure 5:
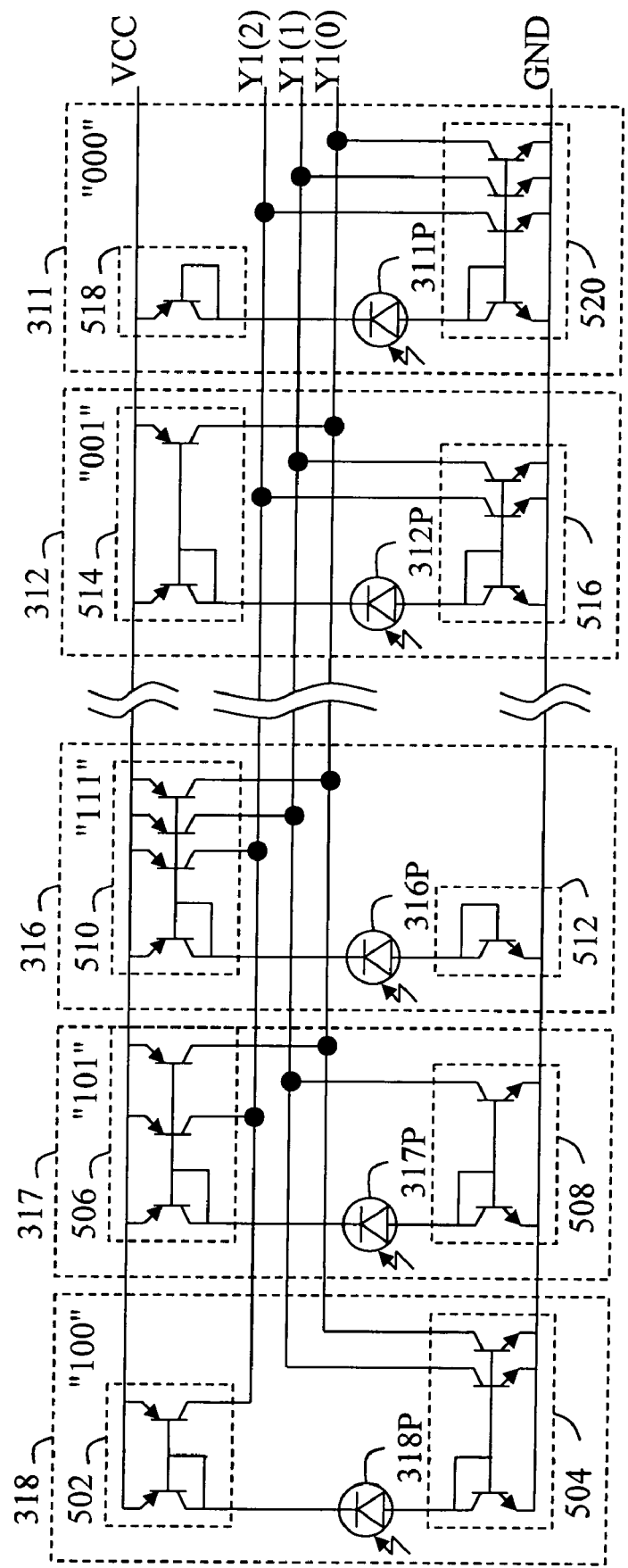
FIG. 5 shows a portion of one row of array elements within a CFPA that determine the column address generator values for the row in accordance with an embodiment of the present invention.

FIG. 5 shows one embodiment of a portion of one row of array elements 116 within CFPA 102 that determine the column address generator values for the row. Alternatively, FIG. 5 illustrates a one-dimensional CFPA 102. Each photodetector generates a photocurrent proportional to the illumination on that array element 116. Some number of current sources and current sinks are activated by each array element photodetector in order to generate the appropriate address code. The current sources and sinks are considered current-based devices since they control current flow. Further, a current source will provide or supply current, while a current sink will absorb or receive current. Examples of current-based devices are bipolar npn-type or pnp-type transistors where a small current imposed on a base junction of a transistor will control a larger collector current, for example. In this embodiment, a current source can supply current onto an address bus output bit if the array element 116 Gray code value is a "1" in the corresponding bit position.

Conversely, a current sink can receive or absorb current from the address bus output bit if the array element 116 address value is a "0" in the corresponding bit position. The net sum of the current on each bus bit can be converted to a digital output value. For example, if the net sum of the current on a particular bus bit is positive indicating a current source is dominating, the digital output signal can be assigned a logical "1". Conversely, if the net sum of the current on a particular bus bit is negative indicating a current sink dominates, the digital output signal can be assigned a logical "0". In this manner, the instantaneous state of current flow directly determines the address code representing the location information of the illuminated element within CFPA 102. Since the current flow on a particular bit of the bus is determined by the dominant current source or current sink, CFPA 102 has the ability to filter out weaker interfering sources and background illumination.

As a CFPA 102 element 116, detector element 318 includes a photodetector 318P that is in series with a current source 502 circuit and a current sink 504 circuit so that, when photodetector 318P is activated, both current source 502 and current sink 504 are activated in proportion to the amount of illumination incident upon photodetector 318P. In one embodiment, current source 502 is implemented as a pnp-type current mirror with one current sourcing output transistor connected to address output bit Y1(2). In this embodiment, current sink 504 is implemented as an npn-type current mirror with two current sinking input transistors connected to address output bits Y1(1:0). In this manner, a three-bit address Y1="100" will be asserted by element 318 when photodetector 318P is illuminated and dominates over other elements 116 in the row array 310. In this case, the three-bit address Y1 is the Gray coded value "100".

The amount of conduction through each of the bootstrapped, diode-connected transistors in the current source and sinks (502, 504) is determined by the amount of illumination upon photodetector 318P. The transistors share a common base-emitter voltage which ensures the current between the emitter and collector in one transistor is the mirror of the current between the emitter and collector in the other transistor. When the illumination level on photodetector 318P is the highest within the row of elements in the array, the conduction in both current source 502 and current sink 504 are also at the highest level so that a Gray coded value "100" is most strongly asserted on a bus Y1 corresponding to the column address of detector element 318.

Similarly, element 317 includes a photodetector 317P that is in series with a current source 506 and a current sink 508 so that when photodetector 317P is activated both current source 506 and current sink 508 are activated in proportion to the amount of illumination incident upon photodetector 317P. Current source 506 is implemented as a pnp-type current sourcing bipolar transistor current mirror with two sourcing transistors connected to address output bits Y1(2) and Y1(0). Current sink 508 is implemented as an npn-type current sinking bipolar transistor current mirror with one current sinking transistor connected to address output bit Y1(1). In this manner, a three-bit address Y1="101" will be asserted by detector element 317 when photodetector 317P is most strongly illuminated. In this case, the three-bit address Y1 is the Gray coded value "101". When the illumination level on photodetector 317P is the highest within the row of elements, the conduction in both current source 508 and current sink 510 are also at the highest level so that a Gray coded value "101" is most strongly asserted on a bus Y1 corresponding to the column address of element 317. If photodetector 318P is more strongly illuminated than 317P, then the Least Significant Bit (LSB), Y1(0), will more strongly sink current, asserting a logic zero level. If the background is non-uniformly illuminated, in some cases the contributions of the weaker illumination spots can dominate the brightest spot. However, if the background is substantially uniformly illuminated, since there are an equal number of sources and sinks on each bus from all the photodetectors, the contributions from the current sources will cancel out the contributions from the current sinks so that the most strongly illuminated photodetector will be determined.

In the case where the Gray coded value for a particular row or column address contains all zeros, such as the column address generator 404 for array element 311 which asserts a Gray code of "000" to Y1, the associated current source 518 will only contain a boot-strapped transistor without a current sourcing transistor. However, column address generator 404 will contain current sink 520 having a boot-strapped transistor along with a maximum number of current sinking transistors. In the case where the Gray coded value for a particular row or column address contains all ones, such as the column address generator for array element 316 which asserts a Gray code of "111" to Y1, the associated current source 510 will include a boot-strapped transistor along with a maximum number of current sourcing transistors. Correspondingly, within array element 316 the current sink 512 will only contain a boot-strapped transistor without a current sinking transistor.

If a second photodetector within a row (or column) is illuminated at a lower intensity, although the value of the currents in the busses may change, the direction of the current as sourcing or sinking, is still determined by the most strongly illuminated photodetector. As long as the total intensity of the background and other sources is less than the intensity of the target image, the output of CFPA 102 is not affected by these other illumination sources. In this manner, if the illumination level on photodetector 318P is the highest within the column of elements containing element 318, a Gray coded value of "100" is strongly asserted on a bus Y1 corresponding to the column address of element 318. When Y1 indicates "100" and X1 indicates "100", then the strongest illumination upon element 318 is detected. If the illumination level on photodetector 317P is the highest within the column of elements containing element 317, a Gray coded value of "101" is strongly asserted on bus Y1 corresponding to the column address of element 317 in the first row 310.

Figure 6:
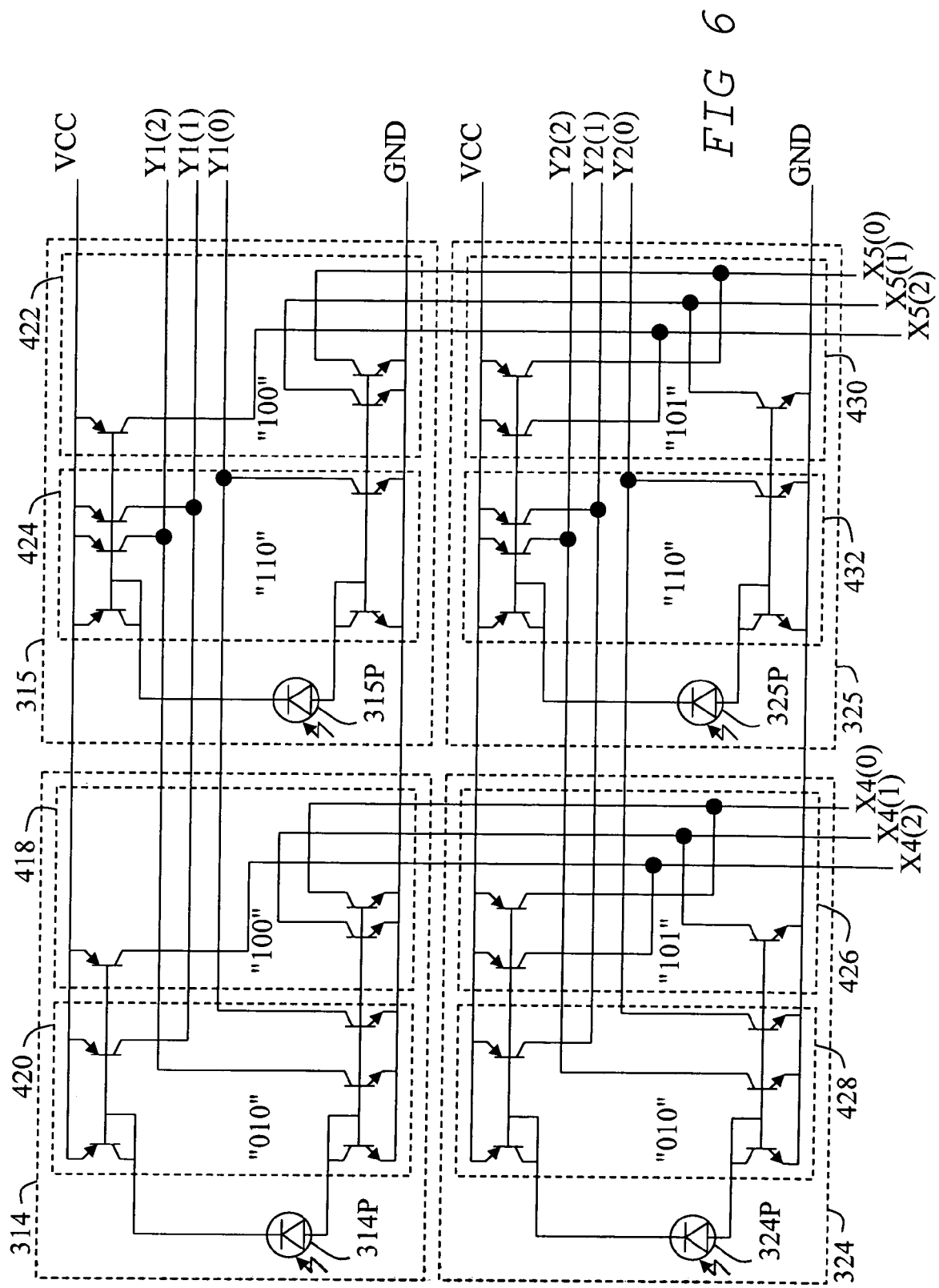
FIG. 6 shows a two-dimensional CFPA including the X-Y address bus connections in accordance with an embodiment of the present invention.

FIG. 6 shows a portion of a two-dimensional CFPA 102 including the X-Y address bus connections. Similar to the structure described in reference to FIG. 5, the structure of FIG. 6 shows the capability of asserting both a row address and a column address simultaneously to locate the X-Y address of the most strongly illuminated element 116 in the array 102. For example, if photodetector element 314P is most strongly illuminated, the Gray coded value "010" will be asserted on the column address bus Y1 while the Gray coded value "100" will be asserted on the row address bus X4. If photodetector element 315P is most strongly illuminated, the Gray coded value "110" will be asserted on the column address bus Y1 while the Gray coded value "100" will be asserted on the row address bus X5. If photodetector element 324P is most strongly illuminated, the Gray coded value "010" will be asserted on the column address bus Y2 while the Gray coded value "101" will be asserted on the row address bus X4. Finally, if photodetector element 325P is most strongly illuminated, the Gray coded value "110" will be asserted on the column address bus Y2 while the Gray coded value "101" will be asserted on the row address bus X5. In this manner, the row and column addresses corresponding to the strongest illumination upon a photodetector element within this two-dimensional array, will be asserted on the corresponding row and column busses.

Figure 7:
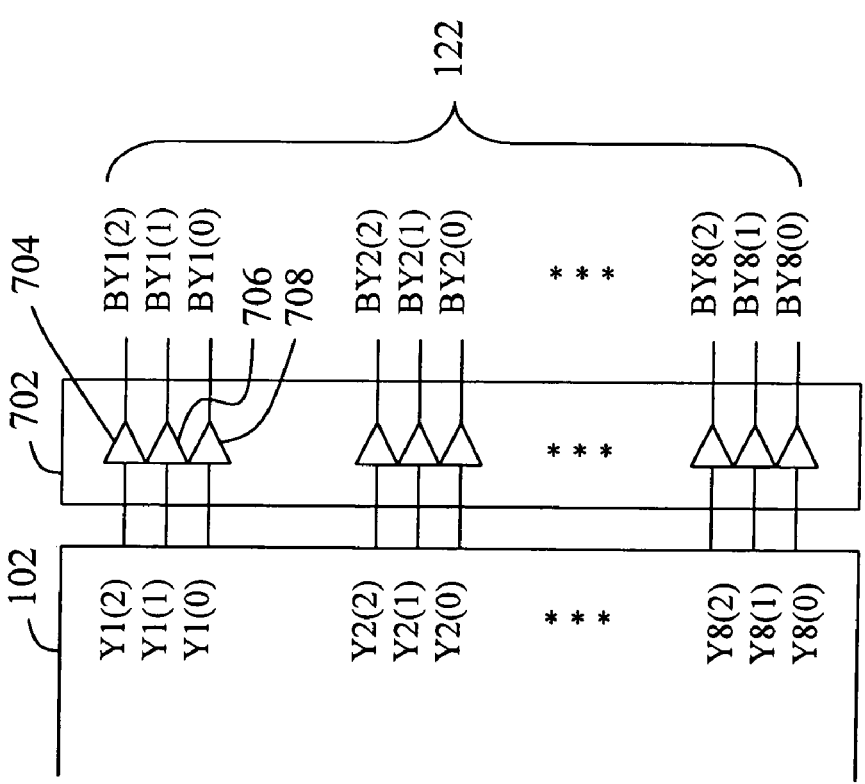
FIG. 7 shows an output buffer block between the array outputs and the position information signal in accordance with an embodiment of the present invention.

FIG. 7 shows an output buffer block 702 between the raw array 102 outputs and the position information signal 122. Output buffer block 702 includes a plurality of output buffers where one buffer is assigned to only one column output signal. Similarly, another buffer output block (not shown) includes a plurality of output buffers where one output buffer is tied to only one row output signal. In reference to the column address bus Y1, output bus line Y1(2) drives the input signal of output buffer 704 which drives a buffered output signal BY1(2). Similarly, output bus line Y1(1) drives output buffer 706 which drives a buffered output signal BY1(1). Finally, output bus line Y1(0) drives an output buffer 708 which drives a buffered output signal BY1(0). In this manner, the array 102 asserts row and column address busses where the raw array 102 outputs do not directly drive subsequent logic.

Figure 8:
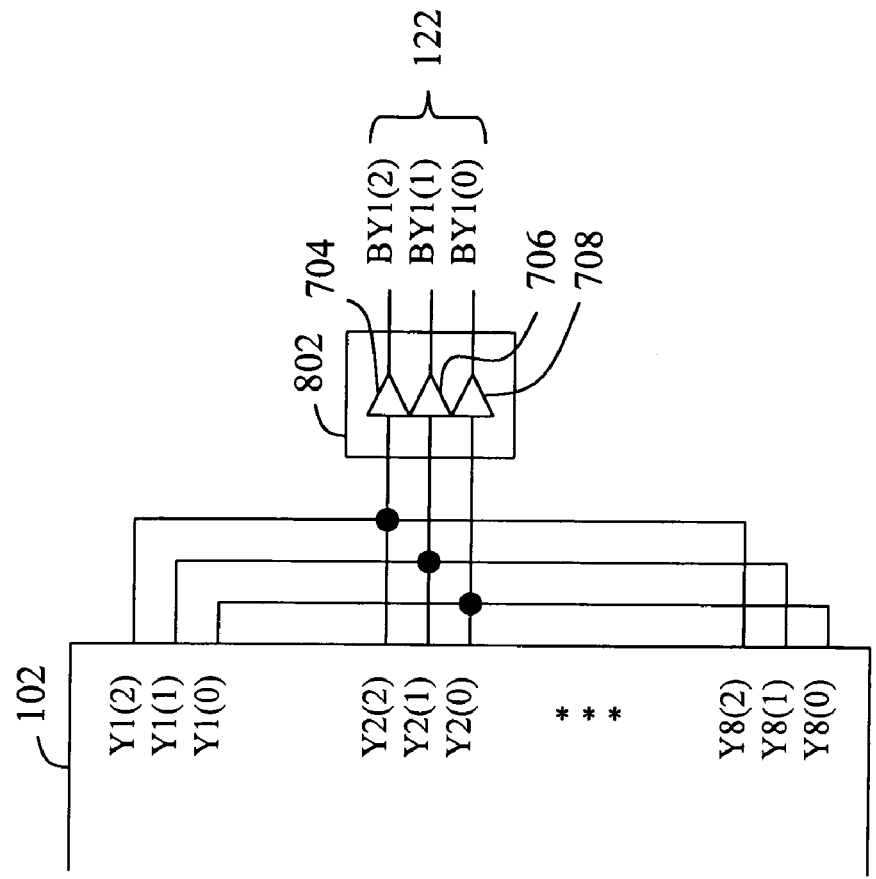
FIG. 8 shows an output buffer block between the array outputs and the position information signal in accordance with an embodiment of the present invention.

FIG. 8 shows an output buffer block 802 between raw array 102 outputs and position information signal 122. Output buffer block 802 includes a plurality of output buffers where one column output buffer is tied to each of the corresponding array output lines where a plurality of column output lines are assigned to only one column output bus. Similarly, another buffer output block (not shown) includes a plurality of row output buffers where one output buffer is tied to each of the corresponding row array output lines where a plurality of output lines are assigned to only one row output bus. In reference to the column address bus Y1, each of the output bus lines Y1(2), Y2(2), through Y8(2) drives the input signal of output buffer 704 which drives a buffered output signal BY1(2). Similarly, each of the output bus lines Y1(1), Y2(1), through Y8(1) drives output buffer 706 which drives a buffered output signal BY1(1). Finally, each of the output bus lines Y1(0), Y2(0), through Y8(0) drives output buffer 708 which drives a buffered output signal BY1(1). In this manner, the array 102 asserts a single column address bus for all columns, with the benefit that a reduced number of column address output lines are needed for position information signal 122.

Figure 9:
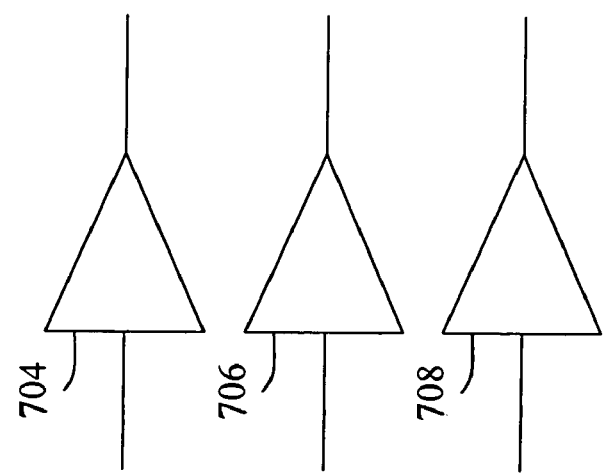
FIG. 9 shows a common buffer element where the output signal faithfully reproduces the value of the input signal at all times in accordance with an embodiment of the present invention.

FIG. 9 shows a common buffer element where the output signal faithfully reproduces the value of the input signal at all times. One of the purposes of providing buffers (704, 706, 708) is isolation so that the raw array 102 outputs do not directly drive subsequent logic. Further, a buffer can provide a level shifting of signal values to accommodate a transition between device types or technologies, for example. In another common usage, a buffer can be used to drive a much larger load than can be driven reliably by the previous circuit. In this case, the buffer may be considered a high-drive buffer.

Figure 10:
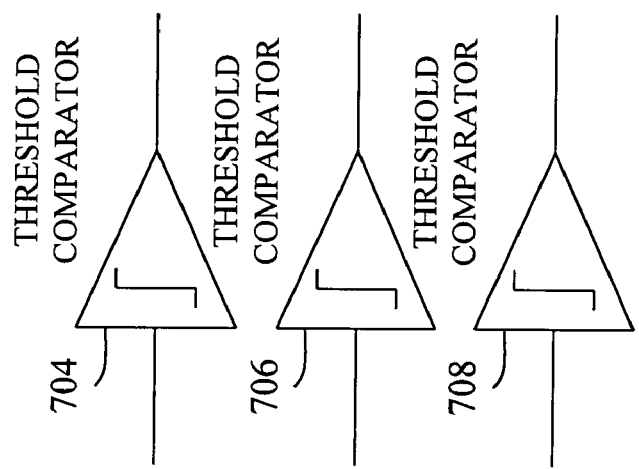
FIG. 10 shows a threshold comparator type of buffer where the buffer output follows the buffer input when the input signal is within two or more predetermined threshold regions in accordance with an embodiment of the present invention.

FIG. 10 shows a threshold comparator type of non-linear buffer where the buffer output follows the buffer input when the input signal is within two or more predetermined threshold regions. For example, if the input signal to the buffer is less than or equal to a lower threshold level, the input signal is in the low region, and the output of the buffer will assume a particular state. If the buffer is non-inverting and the input signal is below the lower threshold value, the output of the buffer will be low. Similarly, if the input signal to the buffer is greater than or equal to an upper threshold level, the input signal is in the high region, and a non-inverting buffer will assume a high state. In this threshold comparator type buffer, three levels of output (High, Low, and Undefined) may be observed where if the input signal is not in either the high region or the low region, the buffer output can assume an intermediate state of neither high nor low in order to indicate the input signal is not within either the upper or lower defined regions. These can be represented as 1=High, 0=Low, -=Undefined. Alternatively, the three-valued logic may be represented as H=High, L=Low, and U=Undefined.

Figure 11:
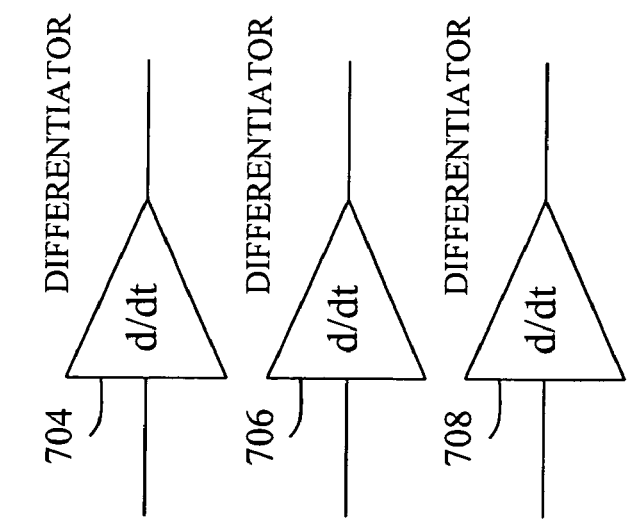
FIG. 11 shows a differentiator type of buffer where the buffer output follows the buffer input when the input signal changes in a predetermined way so that changes in the buffer input signal are propagated to the buffer output in accordance with an embodiment of the present invention.

FIG. 11 shows a differentiator type of buffer where the buffer output follows the buffer input when the input signal changes in a predetermined way so that changes in the buffer input signal are propagated to the buffer output. For example, if the input signal to the buffer is positive-going, that is changing from low to high, then the output of the buffer can be asserted as high for a predetermined time. Conversely, if the input signal to the buffer is negative-going, that is changing from high to low, then the output of the buffer can be asserted as low for a predetermined time. In this way, only changes in the input signal are propagated to the output of the buffer.

Figure 12:
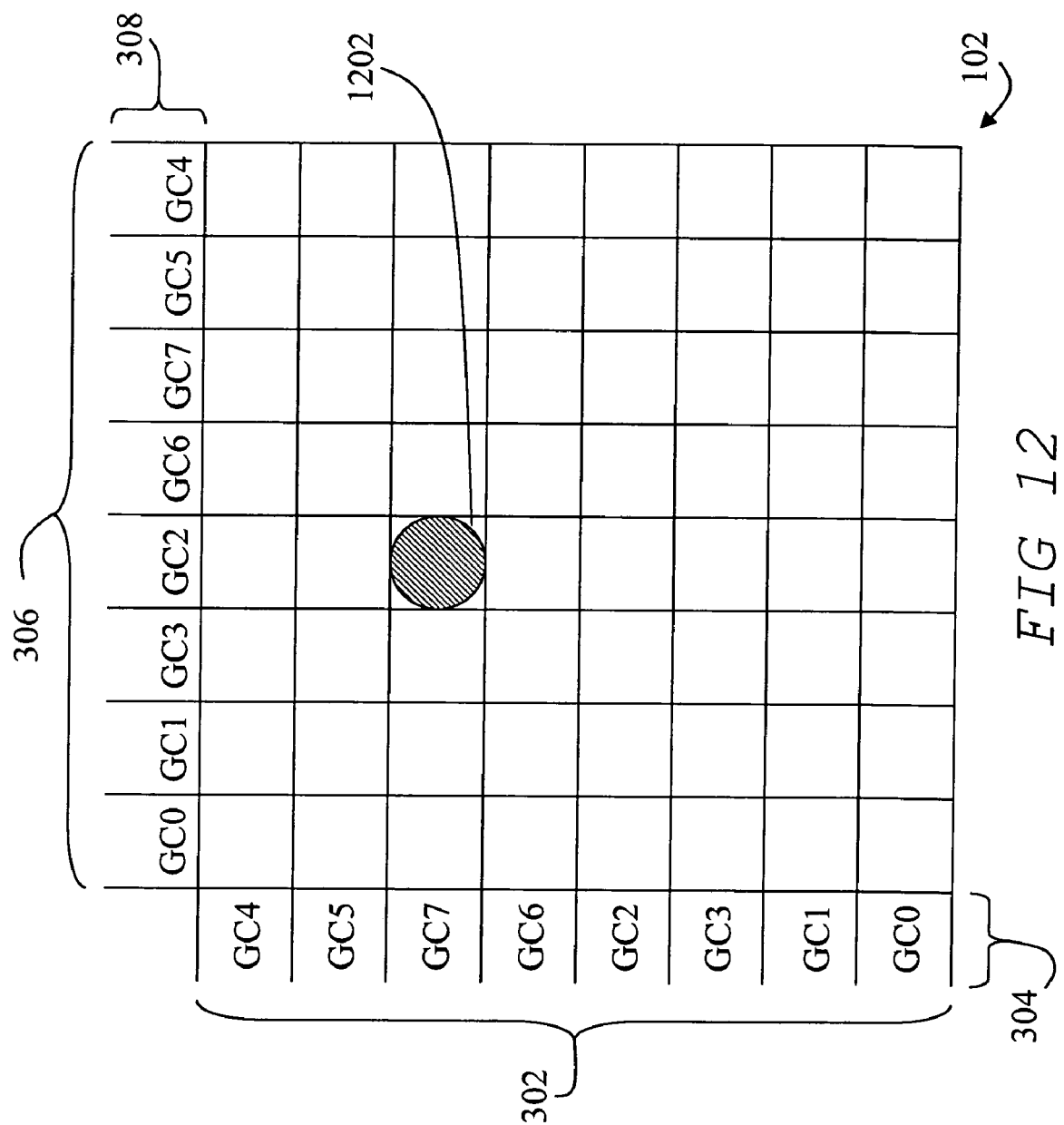
FIG. 12 shows a sample illumination upon a single photodetector element of the detector array in accordance with an embodiment of the present invention.

FIG. 12 shows a sample illumination 1202, or image light, upon a single element 334 corresponding to row address GC7 and column address GC2 of the CFPA 102. In this case, position information signal 122 includes illumination information output from only the row output X4 showing the row address GC7 and the column output Y3 showing the column address GC2. Image light 1202 also illustrates the case where the amount of illumination is brightest on one element of a row or column.

Figure 13:
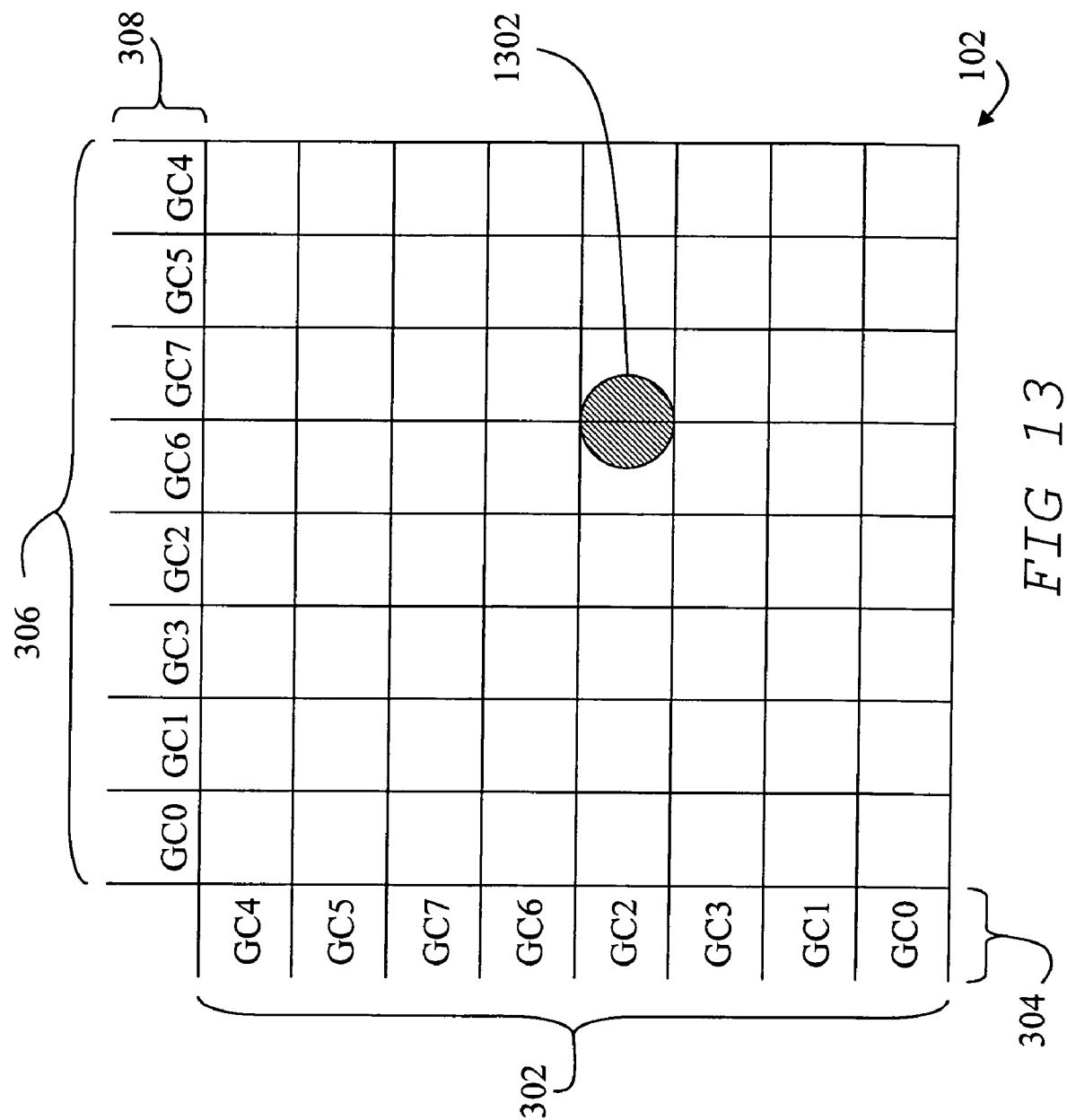
FIG. 13 shows illumination partially upon two neighboring photodetector elements in accordance with an embodiment of the present invention.

FIG. 13 shows image light 1302 partially upon two neighboring elements (355, 356) corresponding to row address GC2 and column addresses GC6 and GC7. In this case, position information signal 122 includes illumination information output from one row address GC2 "010" and two column address GC6 and GC7 "11-", when the outputs are combined, where the Least Significant Bit (LSB) is in the undefined region, and not asserted as either high "1" or low "0". This provides a finer resolution than is possible with only two-valued logic.

Figure 14:
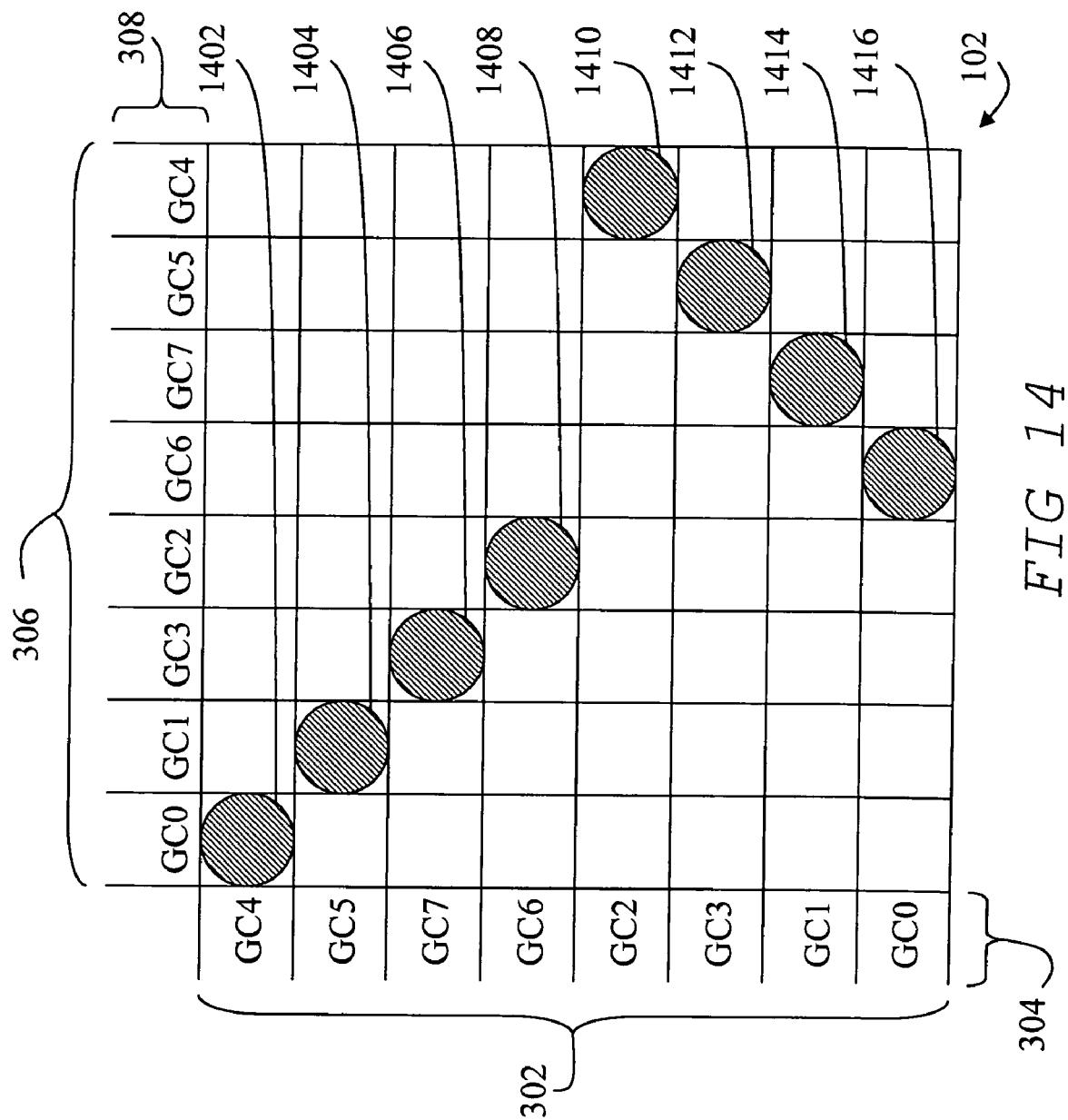
FIG. 14 shows an example light pattern where each row and column of the array has only one point of illumination in accordance with an embodiment of the present invention.

FIG. 14 shows an example light pattern where each row and column of the array 102 has only point of illumination. For this example, image light 1402 illuminates element 311 which generates a row address GC4 on X1 and a column address GC0 on Y1. Similarly, image light 1404 illuminates element 322 which generates a row address of GC5 on X2 and a column address of GC1 on Y2. For completeness, image light 1406 illuminates element 333 which generates a row address GC7 on X3 and a column address GC3 on Y3. Image light 1408 illuminates element 344 which generates a row address of GC6 on X4 and a column address of GC2 on Y4. In this manner, a diagonal line of image light points (1402, 1404, 1406, and 1408) illuminate diagonally adjacent photodetector elements (311P, 322P, 333P, and 344P).

Another diagonal line of image light points is shown in this example where image light 1410 illuminates element 358 which generates a row address GC2 on X8 and a column address GC4 on Y5. Similarly, image light 1412 illuminates element 367 which generates a row address GC3 on X7 and a column address GC5 on Y6. Image light 1414 illuminates element 376 which generates a row address GC1 on X6 and a column address GC7 on Y7. Image light 1416 illuminates element 385 which generates a row address of GC0 on X5 and a column address of GC6 on Y8. In this manner, a diagonal line of image light points (1410, 1412, 1414, and 1416) illuminate diagonally adjacent photodetector elements (358P, 367P, 376P, and 385P). In the case where the array 102 outputs are not tied together, each row and each column can assert an address of the incident illumination. All eight image lights (1402-1416) are detected and none are masked.

Figure 15:
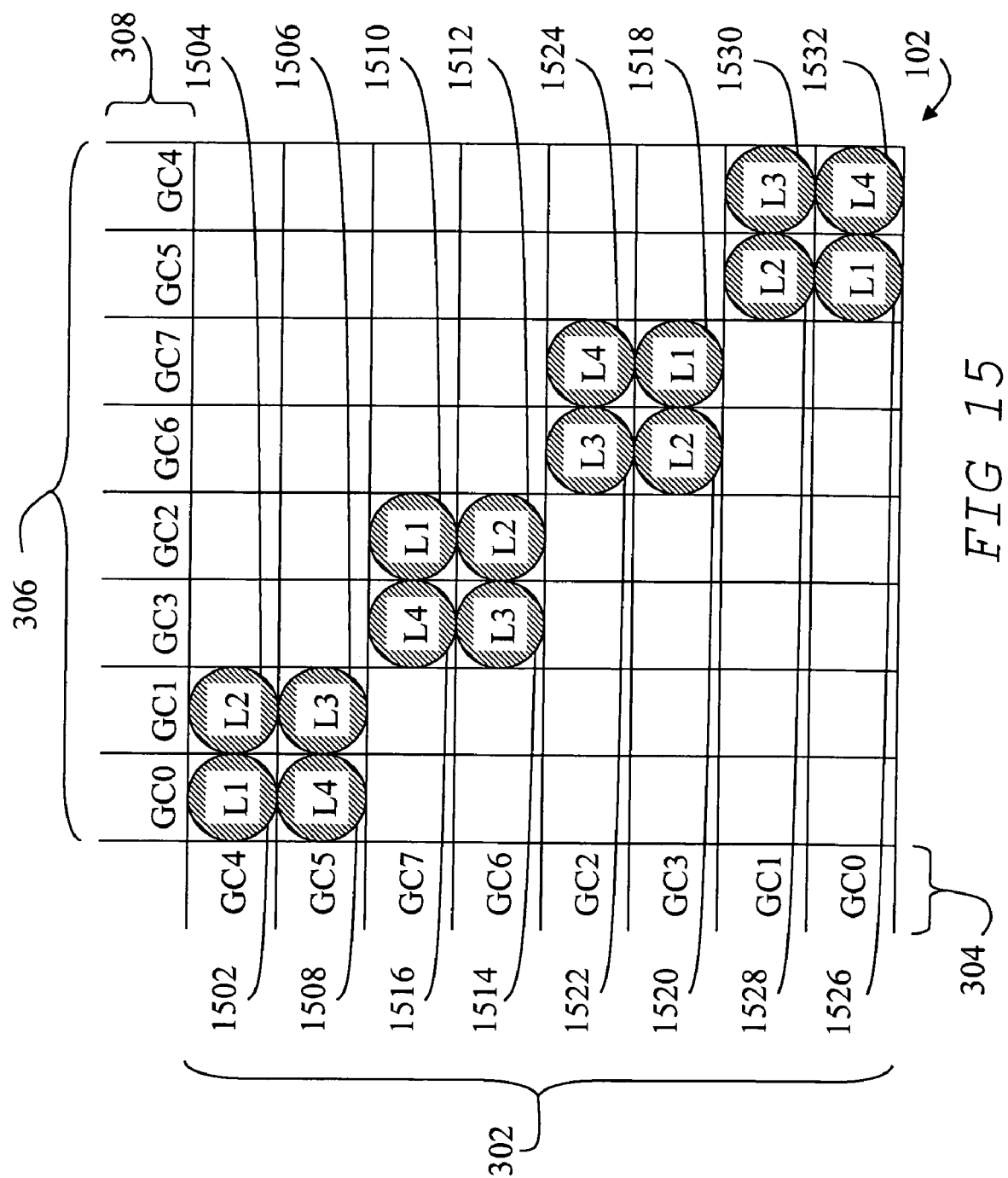
FIG. 15 shows an example light pattern where each row and column of the array has more than one point of illumination, in accordance with an embodiment of the present invention.

FIG. 15 shows an example light pattern having clusters, C1-C4, where each row and column of the array has more than one point of illumination. Given the construction of the custom focal plane array 102, only the address of the strongest illumination in a particular row and column will be asserted as the encoded address value for that row and column. For a particular row, the column address 306 corresponding to the brightest illumination in the row will be asserted for that row. Similarly, for a particular column, the row address 302 corresponding to the brightest illumination in the column will be asserted for that column.

In a first cluster C1, image light 1502 illuminates photodetector element 311P with a first illumination level L1. Image light 1504 illuminates photodetector element 312P with a second illumination level L2 that is less than L1. Expressed algebraically, L1>L2, or L1 is brighter than L2. Image light 1506 illuminates photodetector element 322P with a third illumination level L3 that is less than L2, or L2>L3. Finally, image light 1508 illuminates photodetector element 321P with a fourth illumination level L4 that is less than L3, or L3>L4. In this manner, four adjacent photodetector elements are illuminated with four different levels of illumination in a cluster of decreasing illumination, L1>L2>L3>L4, as viewed in a clockwise orientation with the brightest image light 1502 at the top-left position.

Since L1>L2 and L1>L4, first row 310 and first column 391 will be dominated by the element 311 which asserts a row address GC4 on X1 and a column address GC0 on Y1. Since L2>L3, second column 392 will be dominated by element 312 which asserts a row address GC4 on X2. Since L3>L4, second row 320 is dominated by element 322 which asserts a column address GC1 on Y2. In summary, the following address values are asserted: GC4 on X1, GC0 on Y1, GC4 on X2, and GC1 on Y2. Since GC4 is selected on both X1 and X2, the Y1 address information identifies element 311 as brighter than element 312, while the X2 address information identifies element 312 as brighter than element 322. No information is provided by element 321 so it is masked.

The output address of GC4 on X1 generates the following inequality relationship among the elements:

$$311 > \{321, 331, 341, 351, 361, 371, 381\} \quad \text{(Equation 1)}$$

The output address of GC0 on Y1 generates the following inequality relationship among the elements:

$$311 > \{312, 313, 314, 315, 314, 315, 316, 317, 318\} \quad \text{(Equation 2)}$$

The output address of GC4 on X2 generates the following inequality relationship among the elements:

312>{322,332,342,352,362,372,382}    (Equation 3), while:

The output address of GC1 on Y2 generates the following inequality relationship among the elements:

322>{321,323,324,325,326,327,328}    (Equation 4)

From these inequality relationships we see that 311>312. From Equation 3, 312>322. From Equation 4, 322>321. Therefore, we have enough information to determine that 311>312>322>321. In this case, Equation 1 is redundant (311>321) yet it serves to confirm the result of the inequality relationships.

In a second cluster C2, image light 1510 illuminates photodetector element 334P with a first illumination level L1. Image light 1512 illuminates photodetector element 344P with a second illumination level L2 that is less than L1, or L1>L2. Image light 1514 illuminates photodetector element 343P with a third illumination level L3 that is less than L2, or L2>L3. Finally, image light 1516 illuminates photodetector element 333P with a fourth illumination level L4 that is less than L3, or L3>L4. In this manner, four adjacent photodetector elements are illuminated with four different levels of illumination in a cluster of decreasing illumination, L1>L2>L3>L4, as viewed in a clockwise orientation with the brightest image light 1510 at the top-right position.

Since L1>L2 and L1>L4, third row 330 and fourth column 394 will be dominated by the element 334 which asserts a row address GC7 on X4 and a column address GC2 on Y3. Since L2>L3, fourth row 340 will be dominated by element 344 which asserts a column address GC2 on Y4. Since L3>L4, third column 393 is dominated by element 343 which asserts a row address GC6 on X3. In summary, the following address values are asserted: GC6 on X3, GC2 on Y3, GC7 on X4, and GC2 on Y4. Since GC2 is selected on both Y3 and Y4, the X4 address information identifies element 334 as brighter than element 344, while the Y4 address information identifies element 344 as brighter than element 343. No information is provided by element 333 so it is masked.

In a third cluster C3, image light 1518 illuminates photodetector element 366P with a first illumination level L1. Image light 1520 illuminates photodetector element 365P with a second illumination level L2 that is less than L1, or L1>L2. Image light 1522 illuminates photodetector element 355P with a third illumination level L3 that is less than L2, or L2>L3. Finally, image light 1524 illuminates photodetector element 356P with a fourth illumination level L4 that is less than L3, or L3>L4. In this manner, four adjacent photodetector elements are illuminated with four different levels of illumination in a cluster of decreasing illumination, L1>L2>L3>L4, as viewed in a clockwise orientation with the brightest image light 1518 at the bottom-right position. In this third cluster, the following address values are asserted: GC3 on X5, GC2 on Y5, GC3 on X6, and GC7 on Y6.

In a fourth cluster C4, image light 1526 illuminates photodetector element 387P with a first illumination level L1. Image light 1528 illuminates photodetector element 377P with a second illumination level L2 that is less than L1, or L1>L2. Image light 1530 illuminates photodetector element 378P with a third illumination level L3 that is less than L2, or L2>L3. Finally, image light 1532 illuminates photodetector element 388P with a fourth illumination level L4 that is less than L3, or L3>L4. In this manner, four adjacent photodetector elements are illuminated with four different levels of illumination in a cluster of decreasing illumination, L1>L2>L3>L4, as viewed in a clockwise orientation with the brightest image light 1526 at the bottom-left position. In this fourth cluster, the following address values are asserted by CFPA 102: GC0 on X7, GC5 on Y7, GC1 on X8, and GC5 on Y8.

Figure 16:
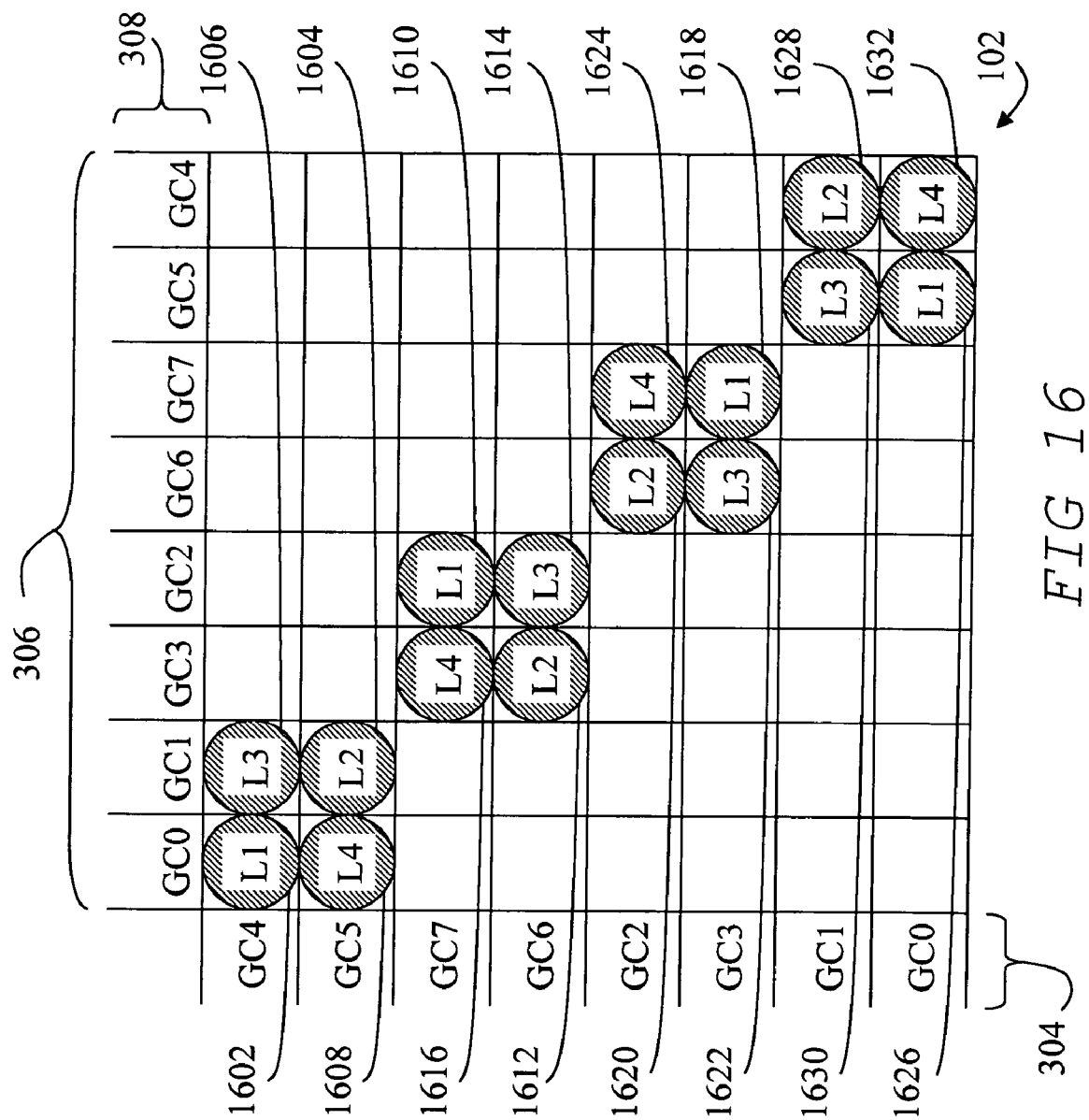
FIG. 16 shows another example light pattern where each row and column of the array has more than one point of illumination in accordance with an embodiment of the present invention.

FIG. 16 shows another example light pattern having clusters, C5-C7, where each row and column of the array has more than one point of illumination. Given the construction of the custom focal plane array 102, only the address of the strongest illumination in a particular row and column will be asserted as the encoded address value for that row and column.

In the fifth cluster C5, image light 1602 illuminates photodetector element 311P with a first illumination level L1. Image light 1604 illuminates photodetector element 322P with a second illumination level L2 that is less than L1, or L1>L2. Image light 1606 illuminates photodetector element 312P with a third illumination level L3 that is less than L2, or L2>L3. Finally, image light 1608 illuminates photodetector element 321P with a fourth illumination level L4 that is less than L3, or L3>L4. In this manner, four adjacent photodetector elements are illuminated with four different levels of illumination in a cluster of decreasing illumination, L1>L2>L3>L4, as viewed in a crossed orientation with the brightest image light 1602 at the top-left position.

Since L1>L3 and L1>L4, first row 310 and first column 391 will be dominated by the element 311 which asserts a row address GC4 on X1 and a column address GC0 on Y1. Since L2>L3 and L2<L4, second row 320 and second column 392 will be dominated by element 322 which asserts a row address GC5 on X2 and a column address GC1 on Y2. In summary, the following address values are asserted: GC4 on X1, GC0 on Y1, GC5 on X2, and GC1 on Y2. No information is provided by elements 312 and 321 so they are masked.

In a sixth cluster C6, image light 1610 illuminates photodetector element 334P with a first illumination level L1. Image light 1612 illuminates photodetector element 343P with a second illumination level L2 that is less than L1, or L1>L2. Image light 1614 illuminates photodetector element 344P with a third illumination level L3 that is less than L2, or L2>L3. Finally, image light 1616 illuminates photodetector element 333P with a fourth illumination level L4 that is less than L3, or L3>L4. Since L1>L3 and L1>L4, third row 330 and fourth column 394 will be dominated by the element 334 which asserts a row address GC7 on X4 and a column address GC2 on Y3. Since L2>L3 and L2<L4, fourth row 340 and third column 393 will be dominated by element 343 which asserts a row address GC6 on X3 and a column address GC3 on Y4. In summary, the following address values are asserted: GC6 on X3, GC2 on Y3, GC7 on X4, and GC3 on Y4. No information is provided by elements 333 and 344 so they are masked.

In a seventh cluster C7, image light 1618 illuminates photodetector element 366P with a first illumination level L1. Image light 1620 illuminates photodetector element 355P with a second illumination level L2 that is less than L1, or L1>L2. Image light 1622 illuminates photodetector element 365P with a third illumination level L3 that is less than L2, or L2>L3. Finally, image light 1624 illuminates photodetector element 356P with a fourth illumination level L4 that is less than L3, or L3>L4. Since L1>L3 and L1>L4, sixth row 360 and sixth column 396 will be dominated by the element 366 which asserts a row address GC3 on X6 and a column address GC7 on Y6. Since L2>L3 and L2<L4, fifth row 350 and fifth column 395 will be dominated by element 355 which asserts a row address GC2 on X5 and a column address GC6 on Y5. In summary, the following address values are asserted: GC3 on X6, GC7 on Y6, GC2 on X5, and GC6 on Y5. No information is provided by elements 356 and 365 so they are masked.

In a eighth cluster C8, image light 1626 illuminates photodetector element 387P with a first illumination level L1. Image light 1628 illuminates photodetector element 378P with a second illumination level L2 that is less than L1, or L1>L2. Image light 1630 illuminates photodetector element 377P with a third illumination level L3 that is less than L2, or L2>L3. Finally, image light 1632 illuminates photodetector element 388P with a fourth illumination level L4 that is less than L3, or L3>L4. As before, since L1>L3 and L1>L4, eighth row 380 and seventh column 397 will be dominated by the element 387 which asserts a row address GC0 on X7 and a column address GC5 on Y8. Since L2>L3 and L2<L4, seventh row 370 and eighth column 398 will be dominated by element 378 which asserts a row address GC4 on X8 and a column address GC1 on Y7.

In summary, the following address values are asserted: GC0 on X7, GC4 on Y7, GC1 on X8, and GC5 on Y8. No information is provided by elements 378 and 387 so they are masked. Other patterns are possible, as well as separation between interposing rows and columns. The above descriptions are intended to illustrate the interaction of various rows and columns utilizing the same photodetector elements, and is not limited to the adjacent cases discussed since any number of rows or columns may be interposed between the sample lighting patterns.

Embodiments described above illustrate but do not limit the invention. It should also be understood that numerous modifications and variations are possible in accordance with the principles of the present invention. Accordingly, the scope of the invention is defined only by the following claims.

We claim:

1. An optical sensing apparatus, comprising;
a plurality of optical sensing elements arranged in an array, each element having a unique element address identifying the location of the element within the array, each element for sensing light and producing an element address signal in proportion to the intensity of light sensed by the element;
an address bus for receiving the element address signal from each element in the array and asserting a continuously valid array output signal corresponding to the address of the element sensing the highest intensity of light; and
a buffer for receiving the array output signal and producing a buffered array output signal, wherein the buffer includes a threshold comparator, the threshold comparator for receiving an input having a signal level less than or equal to a predetermined low signal level and producing a low signal output, the threshold comparator for receiving an input signal having a signal level greater than or equal to a predetermined high signal level and producing a high signal output, wherein when the threshold comparator receives an input signal having a signal level that is both greater than a predetermined low signal level and less than a predetermined high signal level the threshold comparator produces an intermediate signal output.

2. The apparatus of claim 1, wherein the element address is encoded according to a binary Gray coding scheme, the address encoding for side adjacent elements differing by the value of one binary digit.

3. The apparatus of claim 1, wherein the buffer includes a level shifter for receiving an array output at a first level and producing a corresponding output signal at a second level.

4. The apparatus of claim 1, wherein the array is one-dimensional having one of a row and a column arrangement.

5. The apparatus of claim 1, wherein the array is two-dimensional having a row and column arrangement.

6. The apparatus of claim 5, wherein the array output signals for each row and each column are separate producing one array output signal for each row and one array output signal for each column.

7. The apparatus of claim 5,
wherein the array output signals of each row are combined to produce a single row address for a plurality of rows, and
wherein the array output signals of each column are combined to produce a single column address for a plurality of columns.

8. An optical sensing apparatus, comprising:
a plurality of optical sensing elements arranged in an array, each element having a unique element address identifying the location of the element within the array, each element for sensing light and producing an element address signal in proportion to the intensity of light sensed by the element;
an address bus for receiving the element address signal from each element in the array and asserting a continuously valid array output signal corresponding to the address of the element sensing the highest intensity of light; and
a buffer for receiving the array output signal and producing a buffered array output signal, wherein the buffer includes a differentiator, the differentiator for receiving an array output signal and producing a positive-going signal output when the array output changes from a lower value to a higher value, the differentiator for producing a negative-going signal output when the array output signal changes from a higher value to a lower value.

9. An optical sensing apparatus, comprising:
a plurality of optical sensing elements arranged in an array, each element having a unique element address identifying the location of the element within the array, each element for sensing light and producing an element address signal in proportion to the intensity of light sensed by the element; and
an address bus for receiving the element address signal from each element in the array and asserting a continuously valid array output signal corresponding to the address of the element sensing the highest intensity of light, wherein each optical sensing element further comprises:
an optical sensor for receiving light and producing an optical sensor signal in proportion to the intensity of the received light, and
an address generator for receiving the optical sensor signal and producing a unique address signal in proportion to the optical sensor signal.

10. The apparatus of claim 9, wherein the address generator further comprises:
an electronic circuit including a predetermined number of current-based devices, the current-based devices including a predetermined number of current sourcing and current sinking devices.

11. The apparatus of claim 10, wherein the current sourcing and current sinking devices further comprises:
a plurality of bipolar transistors arranged in a current mirror configuration and operatively connected to produce a mirror current in proportion to the optical sensor signal.

12. An optical sensing system, comprising:
a plurality of optical sensing elements arranged in a two-dimensional array having a plurality of rows and a plurality of columns, each element having a unique row and column address identifying the location of the element in the array, each element for sensing light from an object and producing a row address signal and a column address signal in proportion to the intensity of the sensed light, a row address signal corresponding to the element in each row sensing the highest intensity light being asserted as a row output signal for the row, a column address signal corresponding to the element in each column sensing the highest intensity light being asserted as a column output signal for the column, the plurality of row address signals and plurality of column address signals comprising a continuously valid array output signal;
a processing unit for receiving the array output signal and determining an object location information; and
a buffer for receiving the array output signal and producing a buffered array output signal, wherein the buffer includes a threshold comparator, the threshold comparator for receiving an input signal having a signal level less than or equal to a predetermined low signal level and producing a low signal output, the threshold comparator for receiving an input signal having a signal level greater than or equal to a predetermined high signal level and producing a high signal output, the threshold comparator for receiving an input signal having a signal level that is both greater than a predetermined low signal level and less than a predetermined high signal level and producing an intermediate signal output.

13. The system of claim 12, wherein each row address signal and column address signal is encoded in a binary Gray coding so that the encoding of side adjacent elements within each row and column differs by only one bit value.

14. The system of claim 12, wherein the light sensed by the array comprises an image pattern including a plurality of image light levels.

15. The system of claim 13, wherein the plurality of row outputs and the plurality of column outputs identify the location of the most intense light detected by each row and column.

16. The system of claim 13,
wherein the output of each row is combined to produce a single row address output for the plurality of rows;
wherein the output of each column is combined to produce a single column output for the plurality of columns; and
wherein the single row output and the single column output identify the location of the single element in the array receiving the most intense light from the image pattern.

17. A method of determining the most intense light pattern, comprising:
detecting a received light pattern with a plurality of optical sensing elements arranged in an array, wherein each optical sensing element comprises:
an optical sensor for receiving light and producing an optical sensor signal in proportion to the intensity of the received light, and
an address generator for receiving the optical sensor signal and producing a unique address signal in proportion to the optical sensor signal;
asserting an address information for each optical sensing element based on the intensity of the received light; and
producing a continuously valid array output signal corresponding to the location of the optical sensing element within the array receiving the most intense light.

18. The method of claim 17,
wherein the address information is encoded as a binary Gray code.

19. The method of claim 17, further comprising:
combining a plurality of row address outputs into a single row address output; and
combining a plurality of column address outputs into a single column address output,
wherein the single row address output and the single column address output together identify the single optical sensing element receiving the most intense light.

20. The method of claim 17, further comprising:
determining an object location information signal,
wherein the received light is from the object and the object location information is continuously valid.

* * * * *